United States Patent
Mueller et al.

(10) Patent No.: US 7,932,627 B2
(45) Date of Patent: Apr. 26, 2011

(54) ELECTRIC STEERING LOCK, IN PARTICULAR FOR A MOTOR VEHICLE

(75) Inventors: Karl Mueller, Rottweil-Neufra (DE); Gerd Stauss, Sigmaringen (DE); Ralf Maier, Seitingen-Oberflacht (DE); Andreas Titze, Stapeley Nantwich (GB); Ralf Borngräber, Lehre (DE); Dietmar Grave, Meine (DE); Andreas Thiele, Wolfsburg (DE); Klaus Revermann, Wolfsburg (DE)

(73) Assignees: Marquardt GmbH, Rietheim-Weilheim (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 12/252,426

(22) Filed: Oct. 16, 2008

(65) Prior Publication Data
US 2009/0133453 A1    May 28, 2009

Related U.S. Application Data

(63) Continuation of application No. PCT/DE2007/000679, filed on Apr. 17, 2007.

(30) Foreign Application Priority Data

Apr. 18, 2006  (DE) .................. 10 2006 018 175

(51) Int. Cl.
*B60R 25/04* (2006.01)
(52) U.S. Cl. ............. 307/10.3; 307/10.4; 307/10.5
(58) Field of Classification Search ............ 307/10.3, 307/10.4, 10.5
See application file for complete search history.

(56) References Cited

U.S. PATENT DOCUMENTS

| | | | |
|---|---|---|---|
| 6,963,794 B2 | 11/2005 | Geber et al. | |
| 7,254,466 B2 * | 8/2007 | Mori et al. | 701/1 |
| 7,375,440 B2 * | 5/2008 | Suyama et al. | 307/10.2 |
| 7,498,688 B2 * | 3/2009 | Kamiya | 307/10.2 |
| 7,576,636 B2 * | 8/2009 | Dornbach et al. | 340/426.1 |
| 2004/0046639 A1 | 3/2004 | Giehler et al. | |

FOREIGN PATENT DOCUMENTS

| | | |
|---|---|---|
| DE | 37 39 172 C1 | 2/1989 |
| DE | 100 59 991 A1 | 6/2002 |
| DE | 102 02 330 A1 | 7/2003 |
| DE | 102 02 332 A1 | 7/2003 |
| DE | 10 2004 001 904 A1 | 8/2005 |
| DE | 10 2005 031 997 A1 | 2/2006 |
| DE | 10 2005 003 082 A1 | 7/2006 |
| EP | 1 072 487 A1 | 1/2001 |
| EP | 1 504 972 A1 | 2/2005 |

* cited by examiner

*Primary Examiner* — Hal I Kaplan
(74) *Attorney, Agent, or Firm* — Burr & Brown

(57) ABSTRACT

An electric steering lock for a drive authorization system in a motor vehicle, including a movable locking element which, according to a first position, can be brought into locking engagement with a latched-in position on the steering shaft in the steering wheel column and, according to a second position, can be brought out of locking engagement with said position. The steering lock also has a drive for moving the locking element between the two positions, and electronics for controlling the drive. The system may have an associated second device in the form of an electronic key, an identification (ID) transmitter, a chip card or the like, with the result that, when the second device is authorized, the drive can be controlled into the respective position by the electronics. The electronics generate those signals which are used to trigger functions which can otherwise be effected by an electric ignition lock.

15 Claims, 4 Drawing Sheets

ELECTRIC STEERING LOCK, IN PARTICULAR FOR A MOTOR VEHICLE

CROSS REFERENCE TO RELATED APPLICATIONS

This application is a continuation of International Application No. PCT/DE2007/000679, filed Apr. 17, 2007, which designated the United States, and claims the benefit under 35 USC §119(a)-(d) of German Application No. 10 2006 018 175.1, filed Apr. 18, 2006, the entireties of which are incorporated herein by reference.

FIELD OF THE INVENTION

The invention relates to an electric steering lock.

BACKGROUND OF THE INVENTION

Steering locks are used to lock the steering column in a motor vehicle in order to increase protection against theft. DE 37 39 172 C1 discloses an electric steering lock for a drive authorization system in a motor vehicle. The steering lock has a locking element which can be moved between a first position and a second position and is intended to lock the steering shaft when the key has been removed. In the first position, the locking element can be brought into locking engagement with a latched-in position on the steering shaft in the steering wheel column and, in the second position, is not in engagement with the latched-in position. The steering lock has a drive for moving the locking element, which drive has an electric motor and is supplied with electrical voltage by the battery in the motor vehicle.

An additional control unit is required for the electric steering lock. The control unit is usually an ignition lock which, when operated by the associated key, controls the drive for locking and/or unlocking the steering lock.

Such drive authorization systems have also been developed further with so-called "keyless" functionalities. In the case of the "KeylessGo" functionality, an operating signal for drive authorization is automatically transmitted between a device in the form of an electronic key and the control unit if the user is inside the motor vehicle and operates a start/stop button on the dashboard, for example. If the device is authorized, the drive for moving the locking element can then be controlled into the respective position.

SUMMARY OF THE INVENTION

An object of the invention is to configure the electric steering lock, in particular for a drive authorization system with keyless functionality, in such a manner that it is possible to dispense with an additional control unit.

The electronics of the steering lock according to the invention can generate the signals needed for drive authorization. The drive authorization system therefore does not need an additional control unit to generate the signals needed for operation of the motor vehicle. In addition or else alternatively, the electronics autonomously control the drive in an intrinsically safe manner, thus enabling independent operation of the steering lock without an additional control unit. In this case, it is also ensured that the conventional safety requirements are met without monitoring by means of an additional control unit.

There is advantageously no need for any expenditure in order to provide the basic vehicle with KeylessGo. Therefore, a KeylessGo system which can be installed in the vehicle to be provided with keyless functionality by replacing a component or by adding components while retaining the interfaces of the basic vehicle is provided in the invention.

In another embodiment, the electric steering lock generates those signals which are used to trigger functions which can otherwise be achieved by an electric ignition lock which is part of a conventional drive authorization system. According to the operating sequence, the electronics generate the key position signals which are otherwise output by electric switches, for example, in the ignition lock in the case of manual operation using the ignition key. As a result, the steering lock provides a type of key simulation of the electric ignition lock by generating these signals in the electric steering lock itself. These signals then both control the terminals and block lock control. In addition or else alternatively, the electronics independently control the drive according to the operating sequence without the need for the signals which are otherwise output by the ignition lock.

In order to determine drive authorization, electromagnetic signals can be interchanged between the device, which is with the user and is in the form of an electronic key, for example, and the motor vehicle. For this purpose, for their intended operation, the electronics and the device have transmitters and/or receivers. If desired, the electronics may also interact with a transmitter and/or receiver in a separate control unit in the motor vehicle for this purpose. At least one of the transmitted signals may be a coded operating signal for authenticating the device. Following positive evaluation of the transmitted operating signal, that is to say the electronic key is authorized, the drive for moving the locking element is then controlled into the respective position by the electronics.

In order to obtain a compact arrangement, it is appropriate for the electronics and, if appropriate, the associated transmitter and/or receiver to be integrated in the electric steering lock. Such a configuration is suitable for confined installation spaces in motor vehicles.

An antenna for transmitting the signals is connected to the transmitter and/or receiver for the electric steering lock. In particular, the antenna may be provided with a suitable apparatus for controlling the low-frequency (LF) signals for waking up and/or locating the device. If desired for the purpose of reducing the installation space, the antenna may also be integrated in the electric steering lock.

The drive for the steering lock may have an electric motor. The electric motor is expediently supplied with electrical voltage by the battery in the motor vehicle.

In order to trigger driving of the motor vehicle by the user, a start/stop pushbutton which interacts with the electronics is expediently connected to the electric steering lock. In order to save space, it is appropriate to arrange the start/stop pushbutton in the respective installation space of the motor vehicle in which the locking cylinder of the ignition lock is otherwise situated. Therefore, the user can advantageously operate the arrangement in an essentially conventional manner. In addition, the basic vehicle can be provided with the special feature of keyless functionality in a cost-effective manner.

It is also appropriate to extend the drive authorization system according to the invention with an access authorization system for the motor vehicle, which is likewise provided with a type of keyless entry functionality. For this purpose, the electric steering lock expediently interacts with the access authorization system, which again contributes to saving corresponding control units.

In summary, it can be stated for a preferred embodiment that an electric steering lock which is intrinsically safe and simulates the position of the key using the switch signals of the basic vehicle is provided. This electric steering lock is implemented in the installation space of the mechanical lock of the basic vehicle, which is otherwise present. The interfaces for steering are identical to those for mechanical locking.

The electric steering lock may also be replaced with a mechanical lock with a rotary catch by virtue of the rotary catch electronics maintaining the interfaces of the electric steering lock. The inductive antennas are controlled by an additional control unit or a so-called "intelligent" antenna. The keyless sequences are implemented in the electric steering lock.

The advantages achieved with the invention are, in particular, that a cost-effective keyless system is provided. In the sense of an added feature, the electric steering lock can be replaced with a conventional mechanical steering lock. In this case, there is no need for any cost-related changes to the basic vehicle in order to implement a keyless vehicle.

BRIEF DESCRIPTION OF THE INVENTION

One exemplary embodiment of the invention with different developments and configurations is illustrated in the drawings and is described in more detail below.

DETAILED DESCRIPTION OF THE INVENTION

Figure 1:
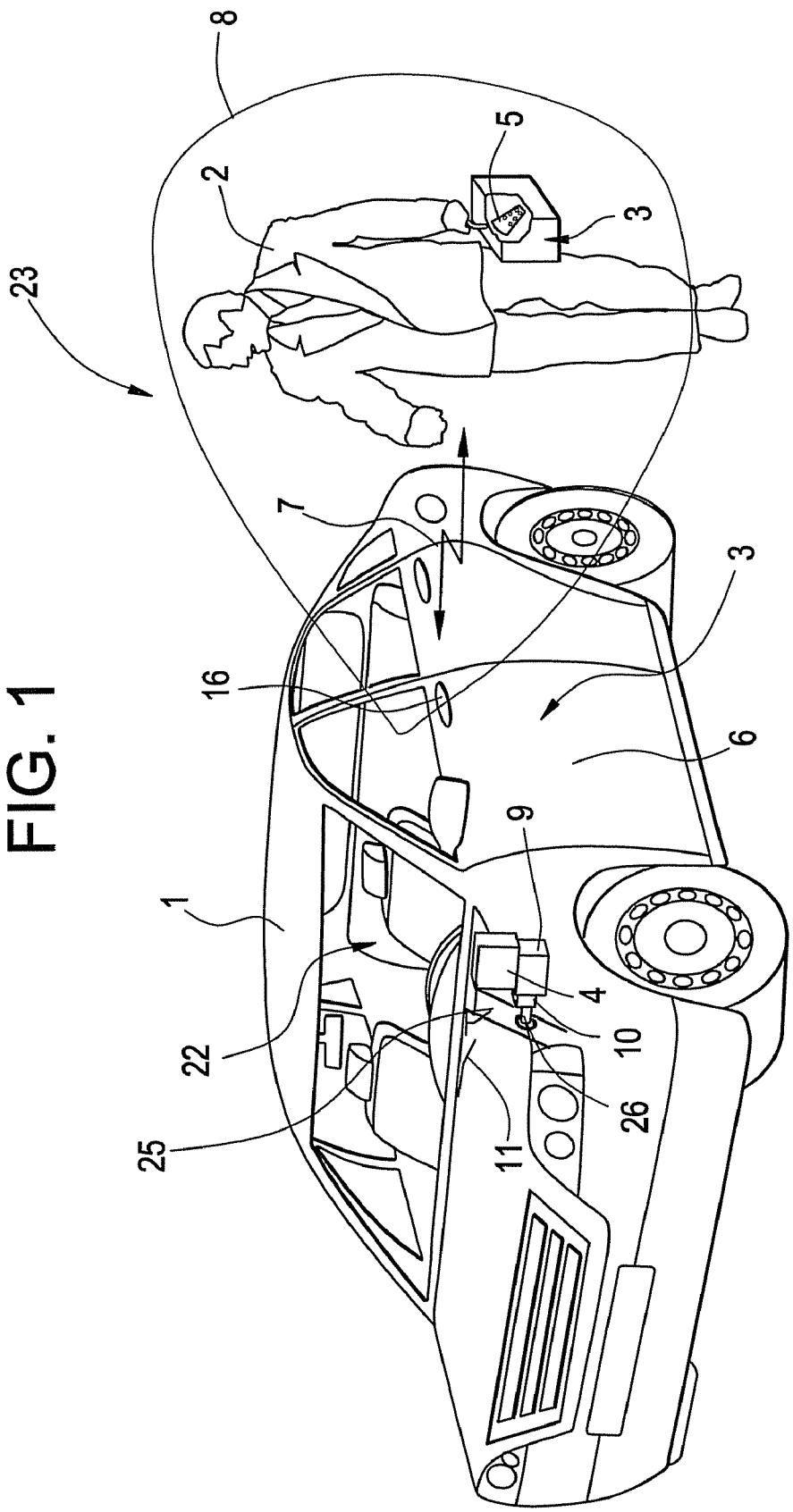
FIG. 1 shows a motor vehicle provided with a locking system.

A motor vehicle 1 with the authorized user 2 can be seen in FIG. 1. For access authorization, the motor vehicle 1 is provided with a locking system 3 in the form of a door locking system which comprises a first device 4 in the form of a control device and an associated second device 5. The second device 5 is in the form of an electronic key, an identification (ID) transmitter, a chip card, a smart card or the like. The second device 5 is in the possession of the authorized user 2 and so the latter has access to the motor vehicle 1 within an effective area 8.

The first device 4 has at least two states, the car doors 6 being locked in the first state and being unlocked in the second state. For their intended operation, the two devices 4, 5 have means for transmitting and/or receiving signals 7 by means of an electromagnetic carrier wave. At least one of these signals 7, which are transmitted between the second device 5 and the first device 4, is a coded electromagnetic operating signal 15 (see FIG. 2). The coded operating signal 15 is used to authenticate the second device 5 so that, when the second device 5 is authorized following positive evaluation of the transmitted operating signal 15, the state of the first device 4 can be changed. The coded operating signal 15 is transmitted when the authorized user 2 operates the door handle 16 on the car door 6 or approaches the door handle 16. As a result, the car doors 6 are unlocked according to the operation-independent keyless entry functionality. The coded operating signal 15 may also be transmitted just as well automatically without involvement of the user 2 as soon as the latter enters the effective area 8 but this is not considered in any more detail below. If the user closes the car doors 6 from the outside, the car doors 6 are automatically locked. The car doors 6 may be locked automatically just as well after the user has left the effective area 8.

For the rest, remote-controllable unlocking and locking of the car doors 6, which can be triggered by the user 2 using operating elements on the second device 5 which are in the form of buttons, is also possible in addition to the keyless entry functionality in order to allow the user 2 to have operation-dependent authorization to access the motor vehicle 1. For example, the central locking system for the car doors 6 can be disabled and/or enabled and the trunk lid can be opened by manually operating the operating elements by virtue of corresponding coded operating signals 15 being transmitted from the second device 5 to the first device 4.

The locking system 3 also determines the drive authorization for the motor vehicle 1. For this purpose, the first device 4 likewise unlocks and/or locks the electric steering lock 9 diagrammatically indicated in FIG. 1 according to the two states. Some other functionally relevant part of the motor vehicle 1 can be controlled just as well by the first device 4 in a corresponding manner. For example, an immobilizer, the engine controller or the like may be enabled and/or disabled thereby. The coded operating signal 15 for authenticating the second device 5 is transmitted when the authorized user 2 is in the motor vehicle 1 and operates a start/stop switch 11. The starting operation or the like of the motor vehicle 1 is thus triggered according to the KeylessGo functionality.

Figure 2:
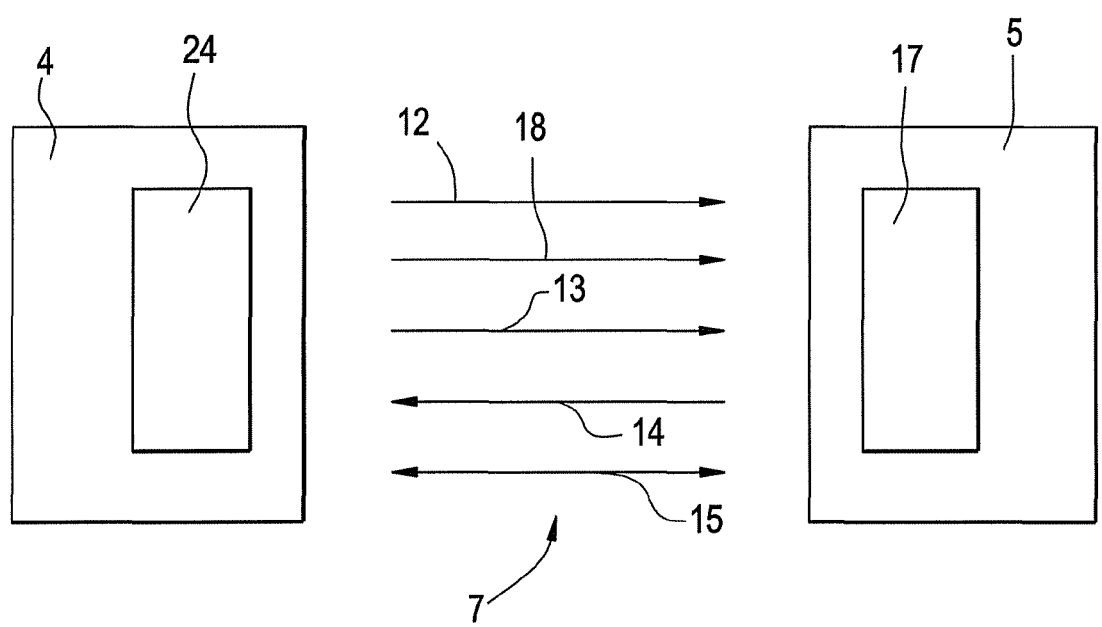
FIG. 2 shows a diagrammatic block diagram of the locking system with a diagram for transmitting the signals.

The method of operation according to the keyless functionalities of the locking system 3 according to the invention shall now be explained in more detail using FIG. 2. The first device 4 first of all uses a transmitter/receiver 24, as a means for transmitting and/or receiving signals, to transmit a first electromagnetic signal 12, which is referred to as a wake-up signal, for the associated second device 5. As a result, the second device 5 is changed from a quiescent state with a reduced power requirement to an activated state for intended operation. The first device 4 then transmits at least one further, third electromagnetic signal 13 which is also referred to as an area delimiting signal below. The associated second device 5 can thus determine its location with respect to the first device 4. In particular, it is possible to determine whether the second device 5 is on the outside of the motor vehicle 1 and, if appropriate, the location on the exterior 23 and/or in the interior 22 of the motor vehicle 1 at which second device 5 is situated. The second device 5 then uses a transmitter/receiver 17 to transmit a fourth signal 14, which comprises the information relating to the location determined and is also referred to as a response signal below, to the first device 4. As already described, the fifth electromagnetic signal is then finally transmitted, in the form of a coded electromagnetic operating signal 15, between the first and second devices 4, 5 using the transmitters/receivers 24, 17 for the purpose of authentication. The signal 15 may comprise, in particular, a plurality of signal elements and may be transmitted between the two devices 4, 5 using bidirectional communication. Reference is also made to DE 43 40 260 A1 with regard to further details of bidirectional communication per se.

The wake-up signal 12 may contain, for example, an identifier of the motor vehicle type. After the wake-up signal 12 has been received, all second devices 5 which are in the effective area 8 and belong to the same motor vehicle type are first of all activated. In a further configuration of the locking system 3, the first device 4 transmits a second electromagnetic signal 18, as a selection signal, to the second device 5 between the first signal 12 and the third signal 13, as can be seen in more detail from FIG. 2. The second signal 18 contains information relating to the more detailed identity of the motor vehicle 1. As a result, only the second devices 5 which are actually associated with the first device 4 remain in the activated state. However, second devices which are in the activated state and are not associated with the motor vehicle 1 are returned to the quiescent state.

Figure 4:
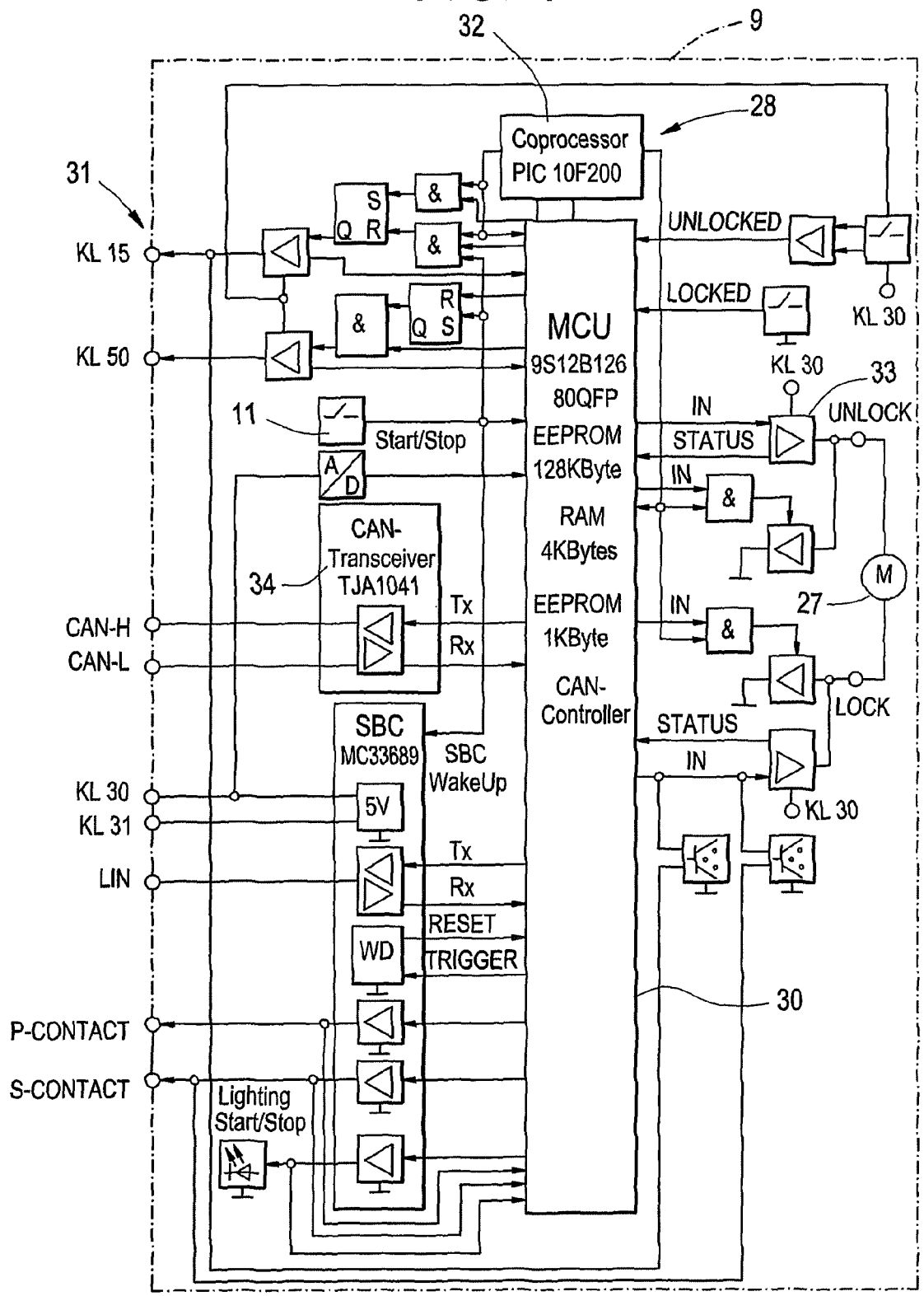
FIG. 4 shows a more detailed diagram of the steering lock from FIG. 3.

The electric steering lock 9 diagrammatically shown in FIG. 1 has a movable locking element 10 which, according to a first position, can be brought into locking engagement with a latched-in position 26 on the steering shaft 25 in the steering wheel column and, according to a second position, can be brought out of locking engagement with latched-in position 26. As is evident in more detail from FIG. 4, the steering lock 9 has a drive 27 which comprises an electric motor, for example, and is intended to move the locking element 10 between the two positions. The drive 27 is supplied with electrical voltage by the battery in the motor vehicle 1. Furthermore, electronics 28 for controlling the drive 27 are arranged in the steering lock 9. When the second device 5 is authorized, the drive 27 for moving the locking element 10 into the respective position, but at least into the second unlocking position, can be controlled by the electronics 28.

The electronics 28 comprise a microprocessor 30 which controls the operating sequences of the electric steering lock 9 in an appropriate manner. On the one hand, the electronics 28 can thus generate the signals which are required for drive authorization and are provided at corresponding outputs 31 of the steering lock 9 which are denoted KL (terminal) 15, KL 50 etc. On the other hand, as can be gathered from FIG. 4, the electric steering lock 9 is a largely closed system which operates independently and without involvement of a further control unit, with the result that the electronics 28 autonomously control the drive 27 using corresponding drivers 33 (see FIG. 3). Furthermore, a coprocessor 32 in the electronics 28 interacts with the microprocessor 30 in a redundant manner in order to ensure that the safety criteria are met. It is therefore a steering lock 9 of an intrinsically safe type ("intrinsic" meaning there is no need for any external signals to control the lock, such as those generated by an ignition lock, and "safe" meaning the redundancy between coprocessor 32 and microprocessor 30). Finally, the electric steering lock 9 also has a BUS module 34 in order to allow communication via the BUS system in the motor vehicle 1.

Figure 3:
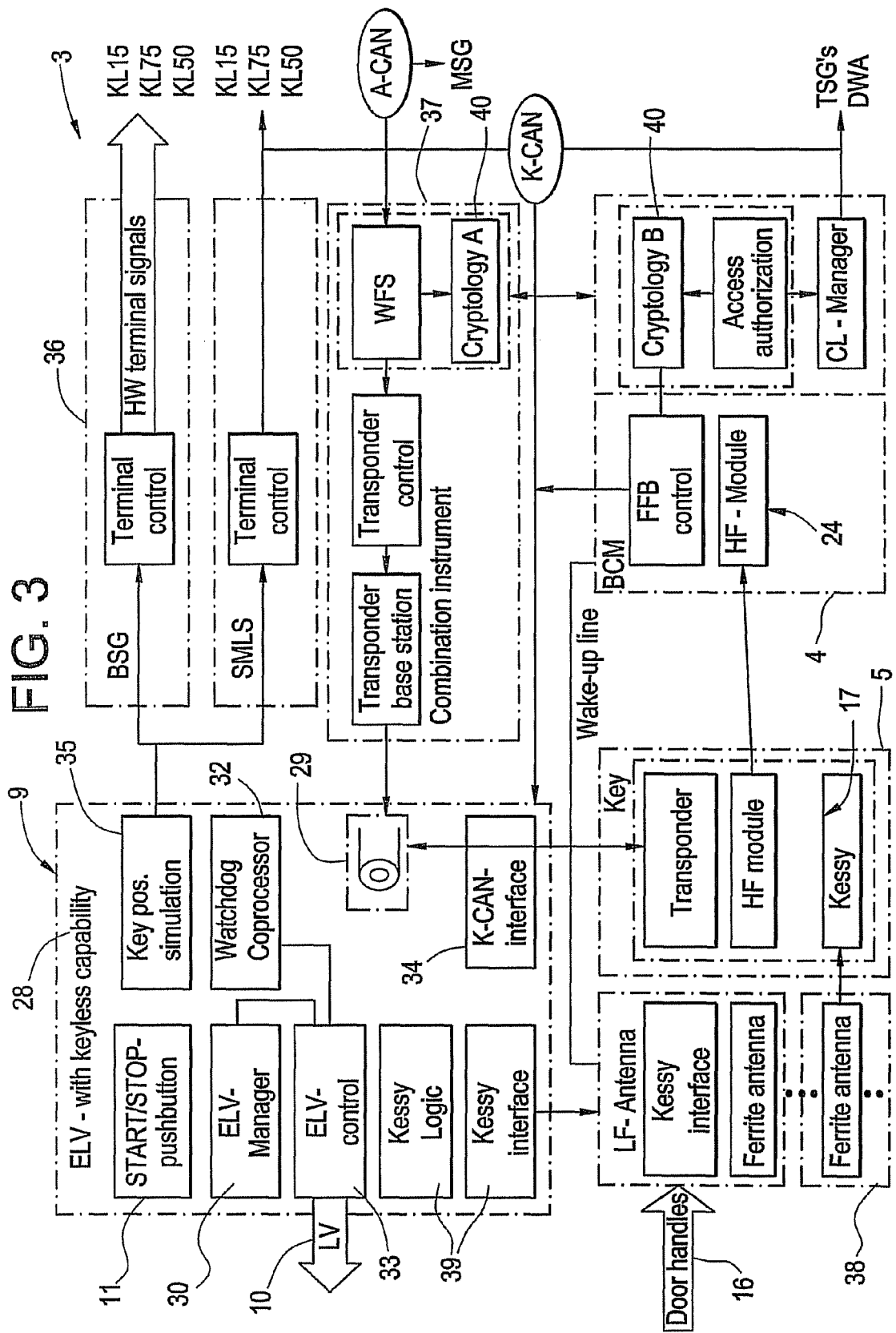
FIG. 3 shows a block diagram of an electric steering lock arranged in the locking system.

The arrangement of the electric steering lock 9, which operates in an intrinsically safe manner, in the locking system 3 can be seen in more detail in FIG. 3.

Those signals which are used to trigger functions which can otherwise be achieved by an electric ignition lock are generated in the electronics 28 of the steering lock 9. The terminal signals of the ignition lock, for example the so-called terminal 15, terminal 50 etc., which enable the switching-on of electrical loads, such as the car radio or the like, are thus simulated in the electronics 28 according to FIG. 3. The electronics 28 generate the key position signals 35, the position switches being simulated using electrical signals which are then passed to the terminal control system 36. The drive 27 is operated independently and thus without the signals which are otherwise output by the ignition lock via the drivers 33 using the microprocessor 30 and the coprocessor 32, as a result of which keyless control is autonomously effected in the electric steering lock 9. The previous mechanical ignition lock is consequently replaced with the electric steering lock 9 without the need for other adaptations to be made to the motor vehicle 1. Overall, intrinsic safety, in particular redundancy of the motor control system for the locking element 10, is thus ensured in the steering lock 9.

As already mentioned, for their intended operation, the electronics 28 and the second device 5 interact with a transmitter and/or receiver 24, 17 using electromagnetic signals 7. During intended operation, in particular for the coded operating signal 15, the two devices 4, 5 generate random numbers and control a cryptological sequence 40 (see FIG. 3). In this case, the first device 4 may interact in an appropriate manner with a combination instrument 37 in the dash board of the motor vehicle 1.

In addition to the electronics 28, the associated transmitter and/or receiver 24 may also be integrated in the electric steering lock 9 if desired, but this is not shown in any more detail in FIG. 3. Furthermore, an antenna 38 for controlling the low-frequency (LF) signals for waking up and/or locating the second device 5 may be connected to the electric steering lock 9 by means of appropriate antenna interfaces 39 and, if desired, may also be integrated in the steering lock. In addition, signals may also be transmitted using a transponder 29 which is used as a type of antenna. The start/stop pushbutton 11 which interacts with the electronics 28 is preferably arranged in an installation space of the motor vehicle 1 where the locking cylinder of the electric ignition lock, which is now dispensed with, would otherwise be situated. Finally, the locking system 3 according to FIG. 3 also provides the access authorization, which is provided using the door handles 16, in a type of keyless entry functionality in the motor vehicle 1.

The invention is not restricted to the exemplary embodiment illustrated and described. Rather, it also comprises all variations within the scope of the invention defined by the patent claims. A steering lock 9 according to the invention may thus also be used in other vehicles such as motorcycles, construction machinery, watercraft or the like.

LIST OF REFERENCE SYMBOLS

1: Motor vehicle
2: (Authorized) user
3: Locking system
4: (First) device
5: (Second) device/electronic key
6: Car door
7: Signal
8: Effective area
9: (Electric) steering lock
10: Locking element
11: Start/stop switch
12: (First) signal/wake-up signal
13: (Third) signal/area delimiting signal
14: (Fourth) signal/response signal
15: (Fifth) signal/(coded) operating signal/code
16: Door handle
17: Transmitter/receiver (in the second device)
18: (Second) signal/selection signal
22: Interior (of the motor vehicle)
23: Exterior (of the motor vehicle)
24: Transmitter/receiver (in the first device)
25: Steering shaft
26: Latched-in position (on the steering shaft)
27: Drive
28: Electronics
29: Transponder
30: Microprocessor
31: Output (for drive authorization signal)
32: Coprocessor
33: Driver
34: BUS module
35: Key position signal
36: Terminal control
37: Combination instrument
38: Antenna
39: Antenna interface
40: Cryptographic sequence

The invention claimed is:

1. An electric steering lock for a steering shaft of a steering wheel column of a motor vehicle, comprising:
    a locking element that is movable between a first position of locking engagement with a latched-in position on the steering shaft and a second position out of locking engagement with said latched-in position;
    a drive for moving the locking element between the first position and the second position;
    electronics for controlling the drive; and
    an associated device in the form of one of an electronic key, an identification (ID) transmitter, and a chip card;
    wherein when the device is authorized, the electronics generate signals to cause the drive to move the locking element at least into the second position,
    wherein said signals trigger functions which would otherwise be triggered by an ignition lock associated with the steering wheel column, and
    wherein the electronics simulate key position signals which would otherwise be output by the ignition lock in the case of manual operation using an ignition key.

2. The electric steering lock as claimed in claim 1, wherein the electronics comprises two independent processors that autonomously control the drive in a redundant manner.

3. The electric steering lock as claimed in claim 1, wherein the electronics generate signals required for a drive authorization system of the motor vehicle.

4. The electric steering lock as claimed in claim 3, wherein the drive authorization system has a keyless go function.

5. The electric steering lock as claimed in claim 1, wherein the electronics control the drive without using signals which would otherwise be output by the ignition lock.

6. The electric steering lock as claimed in claim 1, wherein the electronics and the device each comprise at least one of an electromagnetic transmitter and receiver, wherein at least one signal transmitted between the electronics and the device is a coded operating signal for authenticating the device, such that, following positive evaluation of the transmitted operating signal, the electronics control the drive to move the locking element to one of the first position and second position.

7. The electric steering lock as claimed in claim 1, wherein the electronics are integrated in the electric steering lock.

8. The electric steering lock as claimed in claim 7, wherein the electronics comprise at least one of an electromagnetic transmitter and receiver.

9. The electric steering lock as claimed in claim 1, further comprising an antenna connected to the electric steering lock.

10. The electric steering lock as claimed in claim 9, wherein the antenna is integrated in the electric steering lock.

11. The electric steering lock as claimed in claim 1, wherein the drive comprises an electric motor that is supplied with electrical voltage by a battery in the motor vehicle.

12. The electric steering lock as claimed in claim 1, further comprising a start/stop pushbutton, which interacts with the electronics, connected to the electric steering lock.

13. The electric steering lock as claimed in claim 12, wherein the start/stop pushbutton is arranged in an installation space of the motor vehicle where a locking cylinder of the ignition lock would otherwise be situated.

14. An electric steering lock for a steering shaft of a steering wheel column of a motor vehicle, comprising:
    a locking element that is movable between a first position of locking engagement with a latched-in position on the steering shaft and a second position out of locking engagement with said latched-in position;
    a drive for moving the locking element between the first position and the second position;
    electronics for controlling the drive; and
    an associated device in the form of one of an electronic key, an identification (ID) transmitter, and a chip card;
    wherein when the device is authorized, the electronics generate signals to cause the drive to move the locking element at least into the second position,
    wherein said signals trigger functions which would otherwise be triggered by an ignition lock associated with the steering wheel column,
    wherein the electronics simulate key position signals which would otherwise be output by the ignition lock in the case of manual operation using an ignition key, and
    wherein the electric steering lock interacts with an access authorization system in the motor vehicle.

15. The electric steering lock as claimed in claim 14, wherein the access authorization system has a keyless entry function.

* * * * *